2 Sheets—Sheet 2.
G. R. EVANS.
AMALGAMATING AND CONCENTRATING RIFFLE.
No. 256,555. Patented Apr. 18, 1882.
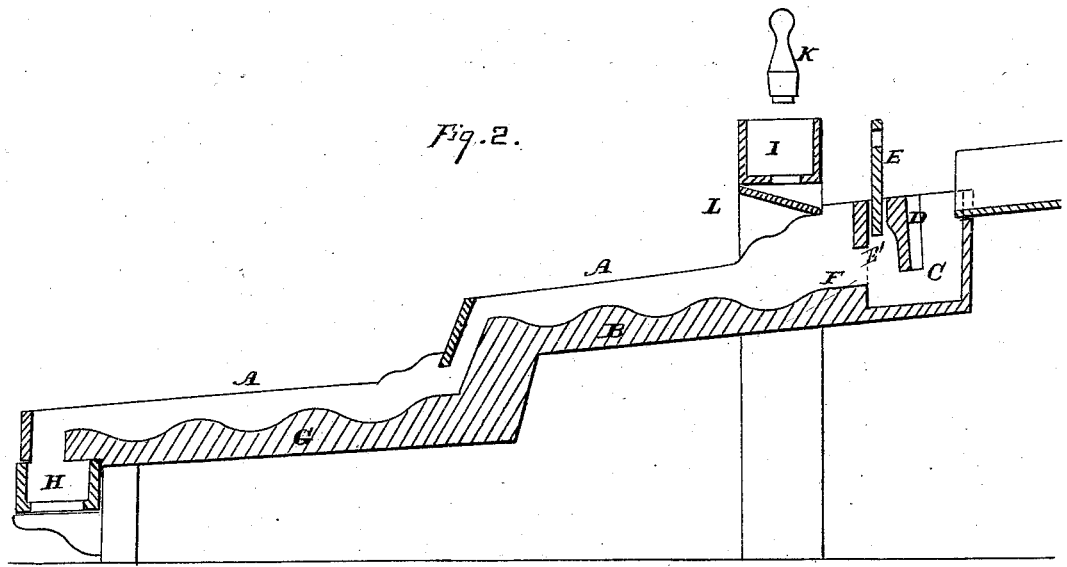
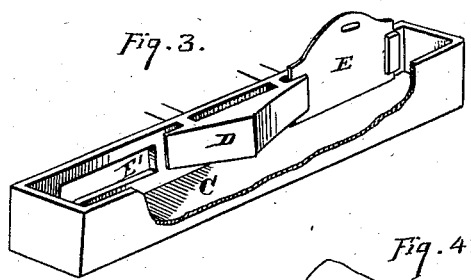
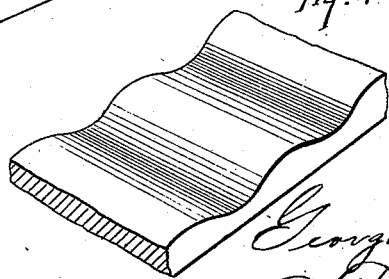
WITNESSES
INVENTOR
George R. Evans
By Dewey & Co.
Attys

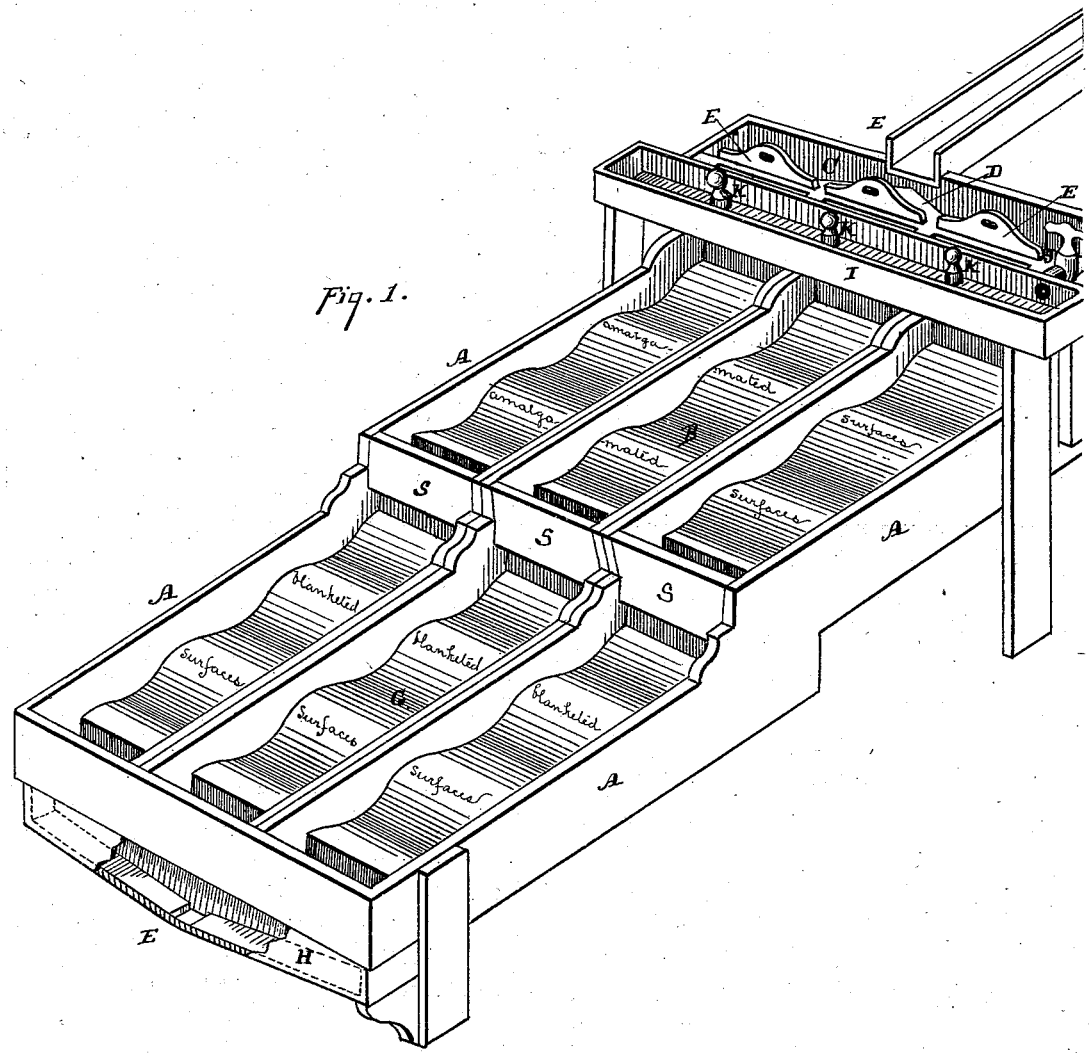
G. R. EVANS.
AMALGAMATING AND CONCENTRATING RIFFLE.
No. 256,555. Patented Apr. 18, 1882.

UNITED STATES PATENT OFFICE.

GEORGE R. EVANS, OF SAN FRANCISCO, CALIFORNIA, ASSIGNOR OF TWO-THIRDS TO ALEXANDER LEWTHWAITE AND SAMUEL P. TAYLOR, OF SAME PLACE.

AMALGAMATING AND CONCENTRATING RIFFLE.

SPECIFICATION forming part of Letters Patent No. 256,555, dated April 18, 1882.

Application filed November 3, 1879.

*To all whom it may concern:*

Be it known that I, GEORGE R. EVANS, of the city and county of San Francisco, and State of California, have invented a new and Improved Amalgamating and Concentrating Riffle; and I hereby declare the following to be a full, clear, and exact description thereof.

My invention relates to a novel construction for amalgamating and concentrating the various precious metals and sulphurets which escape from the mills and other apparatus employed to work ores and auriferous earth; and it consists in the employment of a series of peculiar undulating-surfaced amalgamated riffles, in combination with another series of riffles of the same undulating surface, lined on the surface with blankets conforming to the surface of the riffle.

It further consists in certain details of construction, as hereinafter more fully described and claimed.

It is a well-known fact that the present milling system is so defective and wasteful that a vast amount of precious metals is lost to the world.

The present process of amalgamating and concentrating gold and other precious metals and sulphurets in quartz-mills consists of amalgamated plates next to the battery having an inclined position, so as to allow the pulverized rock to pass over the plates. These plates, being charged with quicksilver for the purpose of amalgamating the particles of precious metals passing over them from the battery, are almost all defective in this respect, that through the gravity of the quicksilver with which they are charged, accelerated by a downward current of water and pulverized rock, and further accelerated by the jarring of the battery-stamps, more or less amalgam is detached from the plates and passes off. This material then passes over flat blanket-sluices, similarly inclined, for the purpose of saving the sulphurets and any particles of precious metals which may have escaped from the preceding plates. The effectiveness of the blankets is in a great measure neutralized by the current of water, causing the nap of the blankets to lie flat, thus allowing a large portion of the precious metals and sulphurets to pass over with the current and be lost.

It is also a well-known fact that in hydraulic and placer mining a vast amount of fine gold is carried off with the tailings, and no effort at all is made to save the sulphurets and platinum, which are also washed away.

Referring to the accompanying drawings for a more complete explanation of my invention, Figure 1 is a view of my invention. Fig. 2 is a longitudinal section. Fig. 3 is a view of the box and distributer. Fig. 4 is a section of the riffle.

A is a suitable frame within which my riffles are supported, at the head of which is a distributing-box, C, the said box receiving its supply of material from a central source, and it extends across the upper or amalgamating series of riffles. The bottom of said box is deeper than the inclined plate at the head of the first riffle, so as to insure an even overflow of the material to be treated. The said box is provided with a spreader, D, so as to distribute the material received through the openings along the said box. The said box is also provided with gates E, so that the material can be gaged to any desirable quantity over the amalgamating-riffles. At the head of the amalgamating-riffle, and contiguous to the gates, is a short inclined plane, F, so as to allow the current to flow with an even surface into the first depression.

B consists of a series of amalgamating-riffles, of any width and any number in length, of an undulating surface, made by the union of alternate reverse curves of shallow depth, so that when the current flows over the ridges it will pass down into the hollows and create a sort of rolling movement or eddy, by which the sand, gold, and other valuable substance are carried over and over and continually brought into contact with the amalgamated surface. This action also brightens any rusty or coated gold, so that it will be more readily amalgamated. There is a peculiar action in an amalgamating gold-collecting surface made in this form, which is much more effective than when a smooth inclined-plane surface with transverse obstructing-riffles is used. The ordinary flat inclined amalgamating-plates are defective in this respect, that through the gravity of the quicksilver with which they are charged, accelerated by the downward current of water and pulp and the jarring of the stamps, more or less amalgam is detached from the plates and passes off. The finest of the particles of gold which will float on the surface of the current of the water never reach the plate at all, so do not come in contact with the mercury. Then the material passes over inclined blanket-sluices, flat like the plates, so that the blanket-threads will catch the sulphurets and any fine floating particles of gold which have escaped the plates. The effectiveness of the blankets is in a great measure neutralized by the nap of the blankets being flattened by the current. It is not only in quartz-mining these losses occur; but in placer and hydraulic work the fine gold passes off with the tailings, and efforts to save the sulphurets or platinum have been abandoned as futile.

The peculiar features of my improved riffle are the undulating surface over which the material under treatment flows and the curious and effective action due to the form by which a succession of dead-water eddies occurs in the current, these eddies forming at the lowest points and in such a position as to retard and stay the onward progress of passing particles of gold, amalgam, and mercury. As the current passes over the ridge into the hollow or concave it breaks and forms a riffle or wave with a very effective and peculiar reflex action. The material which the current carries is at this point brought by the rolling action of the water—the eddy or wave—into contact with the plates, and any fine gold or floured quicksilver is saved, the lighter material passing on with the water. There is not the chance for the loss of quicksilver as on flat plates, since each depression serves as a receptacle, from which, in order to escape, it must, in the first place, move out of the dead-water, and must also travel up an incline, neither of which can it very readily do. This riffle is somewhat different from what is implied in the ordinary acceptation of the term. It is not a rigid transverse bar or obstruction above the surface, designed to intercept the onward progress of the material; neither is it a pocket or transverse slot or opening designed for the same purpose. It is a water-riffle, an elastic check in constant and ceaseless motion, but more effective in retarding the progress of the precious particles. The current is not suddenly checked and the water agitated by a rigid obstruction tending to actively disturb the molecules, but the wave forms naturally, and a water-riffle is the consequence. This water-riffle, by its constant shaking and agitation, has a concentrating action similar to that brought about by shaking a pan back and forth, by which the lighter worthless particles are separated and allowed to flow off, while the heavier precious particles are retained under and within it. The material is not stopped above the riffle, but in it, and once stopped is held under it. The shaking of the water-riffle caused by its particles being constantly changed as new ones come and the others pass on has the effect of preventing packing of the heavy material under the riffle in the hollow where it forms; so a continual concentration ensues, the gold and quicksilver being shaken down to the amalgamated surface below any black sand. It will be seen that no such action as this is possible in a rigid transverse riffle formed of wood or copper. In the first place the material cannot get under such a riffle, which, moreover, is liable to let the sand pack above it, and there is no concentrating action at all.

The wave-riffle cannot be formed on a plane surface without the use of rigid transverse bars, but forms naturally in the undulating surface described. The riffle is elastic in its nature, and while its component parts are constantly changing its form always remains the same, thus checking and depositing the heavier particles, while it also carries away the lighter. To form this water-riffle properly it is necessary to have the surface in regular wave-lines, with no projections above or depressions below said wave-lines, so that a smooth, easy flow of the water is insured when the elastic riffles form naturally. Corrugated riffles with depressions or projections will not cause a suitable wave-riffle to be formed. The constantly flowing current will eventually carry the material over the first upward curve or ridge and into the next depression, where the same action again takes place, and as the riffles may be of any desired length it will be manifest that the continuous and repeated action will amalgamate and save most of the valuable metal which is contained in the passing material.

G is another series of riffles, of the same undulating surface as described above, set at a lower elevation; but this series is lined on the surface with a blanket for concentrating and saving sulphurets, platinum, and any precious metals which may have escaped from the amalgamating section. The peculiar action of the current in forming a revolving eddy, as described in the amalgamating series, causes the nap of the blankets affected by this action to attain an upright position, thus presenting to the precious particles a more secure lodgment.

The amalgamating-riffles B are arranged in a plane above the blanket-riffles G, and between the two kinds of riffles I place vertical splash-boards s s, which the descending current strikes, and is thereby broken up and evenly distributed over the blanket-riffles.

H is a trough into which the waste materials fall. This trough tapers or converges to a common center, so that the whole of the refuse and water can be conveyed to any desired point.

When it is necessary or desirable to clean up any one of the riffles its gate E will be closed and water may be turned into the head of the riffle from the trough I. This trough is situated at a sufficient height above the riffles, and receives a supply of water from the pipe and cock J. Gates, plugs, or other controlling-valves, K, admit the water from the trough to the riffles, and the inclined guide or board L insures its delivery at the very head of the riffles and to their supply-gates, so that the whole course of the riffles may be perfectly cleansed.

The operation of my riffles is peculiar, from the long shallow curves over which the material flows. As it descends into each of the depressions it strikes under the material which is held by the opposite ascending curve, and forms a sort of eddy, which causes it to be carried over and over and brought many times in contact with the amalgamated surface in each depression before it escapes to the next. This rolling motion also tends to scour and cleanse the particles by their attrition against each other, so that their amalgamation is greatly facilitated. After passing through these riffles, which may be of any desired length, any valuable particles which have not been amalgamated and the sulphurets will be exposed in the lower blanket-riffles to the action of the same rolling motion, and this action will cause the filaments or nap of the blanket-covering to attain an upright position, so that the particles will be more surely caught, and the whole device thus forms an amalgamating and concentrating riffle for saving gold, amalgam, sulphurets, and other valuable heavy substances.

In my patent of February 2, 1869, No. 86,379, I have shown, in combination with other devices, an upper riffle which consists of semi-cylindrical curves, every alternate one of which has a slot in the lowest point of the depression to discharge the concentrated material into a lower receptacle. The intermediate unperforated curves in this old patent serve simply as receptacles over which the current flows, and into which heavy particles may settle; but from the shape of the curves the sides are too nearly vertical to allow of any such motion as takes place in my present machine.

I am aware that blankets designed to cover sluice-boxes have been woven with ribs in the fabric; and I am also aware that blankets having diagonal projecting hairs to lie against the current of the stream of water have been fastened on the bottoms of sluice-boxes with the edges of the blanket-sections overlapping each other.

Having thus described my invention, what I claim as new, and desire to secure by Letters Patent, is—

In combination with the blanket, the riffle-bed G, made with gentle undulating curves, whereby the nap of the blanket is prevented from lying flat by the flow of the current of water.

In witness whereof I have hereunto set my hand.

GEORGE R. EVANS.

Witnesses:
S. H. NOURSE,
FRANK A. BROOKS.